United States Patent

Schulte et al.

[11] Patent Number: 5,270,707
[45] Date of Patent: Dec. 14, 1993

[54] PROCESS AND APPARATUS FOR THE AVOIDANCE OF BIRD IMPACTS ON AIRPLANES

[75] Inventors: Peter Schulte, Arnsberg; Siegfried Schmees, Geseke; Werner Lepper, Erwitte; Dieter Nolte, Geseke, all of Fed. Rep. of Germany

[73] Assignee: Hella Kg Hueck & Co., Lippstadt, Fed. Rep. of Germany

[21] Appl. No.: 855,008
[22] PCT Filed: Sep. 12, 1991
[86] PCT No.: PCT/EP91/01732
§ 371 Date: May 4, 1992
§ 102(e) Date: May 4, 1992
[87] PCT Pub. No.: WO92/05528
PCT Pub. Date: Apr. 2, 1992

[30] Foreign Application Priority Data

Sep. 14, 1990 [DE] Fed. Rep. of Germany ....... 4029205

[51] Int. Cl.$^5$ ............................................. B64D 47/06
[52] U.S. Cl. ................................... 340/981; 244/1 R; 315/241 S; 340/945; 340/961; 362/62
[58] Field of Search ............... 340/981, 982, 961, 945, 340/471, 472, 331; 362/62; 315/241 S; 43/1; 244/1 R; 116/22 A

[56] References Cited

U.S. PATENT DOCUMENTS

| 3,183,480 | 5/1965 | Adler . | |
|---|---|---|---|
| 4,346,430 | 8/1982 | Holland | 340/982 |
| 4,384,269 | 5/1983 | Carlson . | |
| 4,475,102 | 10/1984 | Troy et al. | 340/385 |
| 4,477,796 | 10/1984 | Kearsley | 315/241 S |
| 4,736,907 | 4/1988 | Steffen | 244/1 R |
| 4,964,331 | 10/1990 | Halevy et al. | 244/1 R |

FOREIGN PATENT DOCUMENTS

0236267A2 9/1987 European Pat. Off. .

Primary Examiner—Brent Swarthout
Attorney, Agent, or Firm—Griffin Butler Whisenhunt & Kurtossy

[57] ABSTRACT

In a process and an apparatus for the avoidance of bird impacts on airplanes by means of at least one light-flashes generating light source on an airplane, for which the frequency of the generated light flashes is varied through at least one cycle, the flash frequency is varied dependent upon the speed and/or the altitude and/or the acceleration of the airplane in order to provide an optimal flash frequency range for all take-off and landing phases and at the same time to be independent of a load and the type of airplane.

5 Claims, 1 Drawing Sheet

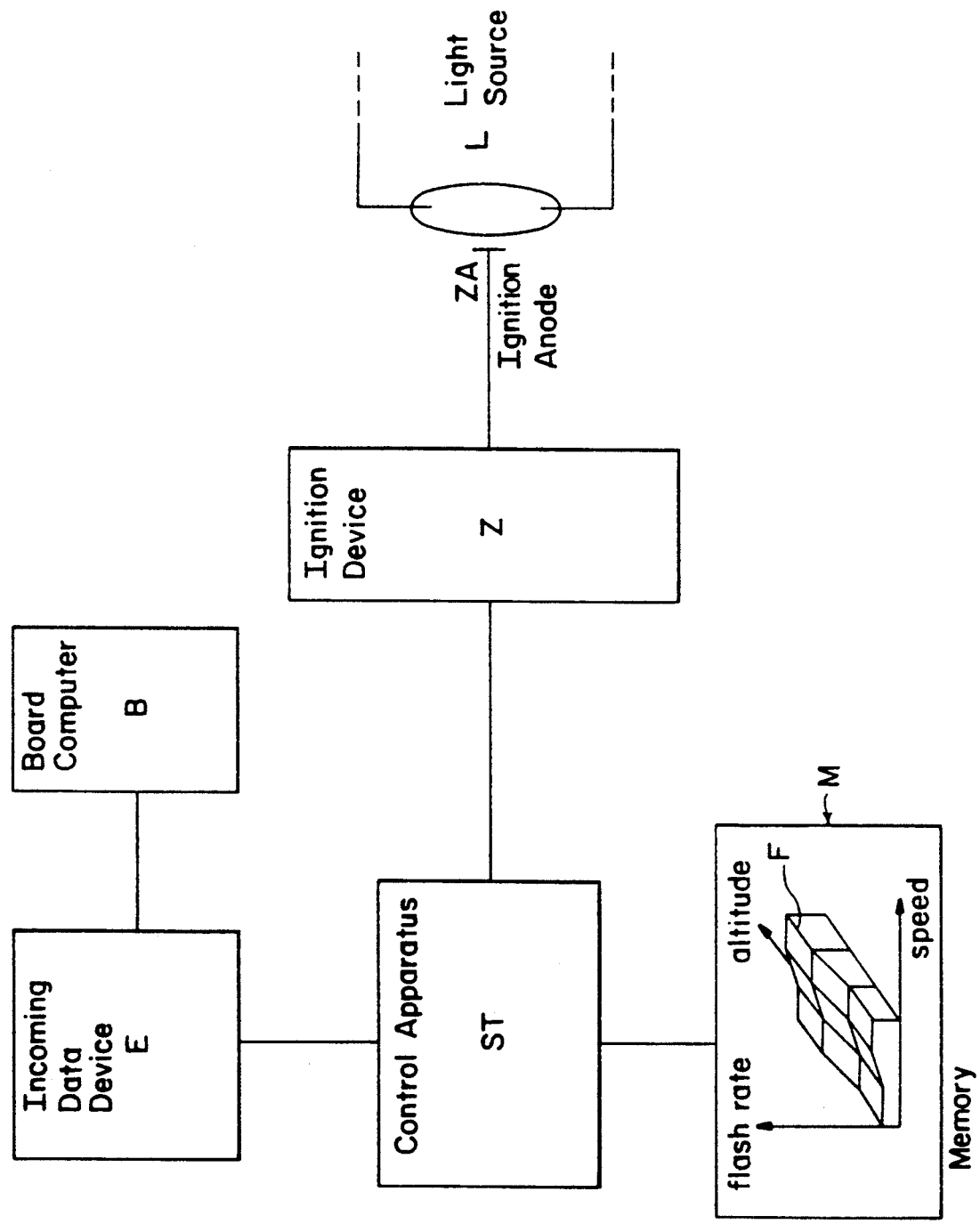

PROCESS AND APPARATUS FOR THE AVOIDANCE OF BIRD IMPACTS ON AIRPLANES

BACKGROUND OF THE INVENTION

This invention generally relates to a process for the avoidance of bird impacts on airplanes by means of at least one light source on an airplane generating light flashes wherein a frequency of the generated light flashes is varied through at least one cycle and relates to an apparatus for the avoidance of bird impacts on airplanes comprising at least one light source on an airplane for emission of light flashes, which is controlled by a control apparatus, and a memory in which at least one cycle is stored for a variation of light flashes.

A process and an apparatus for the prevention of bird impacts of this kind is known from European patent application 0 236 267 A2. In this invention, bird impacts on airplanes are prevented by means of at least one light source generating light flashes mounted on an airplane. The frequency of the generated light flashes is varied through at least one cycle. The frequency is continuously increased once or several times at take-off of the airplane in a range between 0.1 Hz and 3 Hz, to then be held at a maximum frequency. It is beneficial to use two light sources during this process.

It proves to be disadvantageous for a cycle to be fixedly predetermined so that when used in different types of airplanes the cycle must be adapted thereto, requiring a lot of effort and leading to higher cost. In this regard, it appears to be particularly disadvantageous that even after adaptation to respective types of airplanes, it cannot be taken into consideration, due to the predetermined cycle, whether an airplane is fully, partially or not loaded at all so that an optimal flash frequency variation, and thereby an optimum of bird-impact prevention, cannot be achieved. Even cycling through several cycles in which the frequency is increased and thereafter is held at a maximum does not lead to a desired adaptation to respective types of airplanes nor to an effective prevention of bird impacts on airplanes, since continuously running flash sequences produces a habit-forming effect thereby reducing safety during operation of an airplane in take-off and landing phases.

It is an object of this invention to provide a process and an apparatus for the prevention of bird impacts which offer an optimal flash frequency for all take-off and landing phases and are independent from a degree of loading and, in addition, not specific to a type of airplane.

SUMMARY

According to this invention, a bird-avoidance flash frequency is varied dependent upon the speed and/or the altitude and/or the acceleration of an airplane.

BRIEF DESCRIPTION OF THE DRAWING

The invention is described and explained in more detail below using the embodiment shown in the drawing. The foregoing and other objects, features and advantages of the invention will be apparent from the following more particular description of a preferred embodiment of the invention, as illustrated in the accompanying drawing in which reference characters refer to the same parts throughout the application.

The only figure shows a simplified block diagram of an apparatus for the avoidance of bird impacts on airplanes.

DESCRIPTION OF A PREFERRED EMBODIMENT

A control apparatus ST, in which the variable flash frequency is generated, is electrically-conductively linked to an ignition device Z. The ignition device Z is electrically-conductively linked to an ignition anode ZA of a light source L, which is constructed as a discharge lamp in this embodiment. A power supply device of the light source L is not shown.

For generation of variable flash frequencies which are dependent upon flight parameters the control apparatus ST comprises a memory M, set up here, for example, as a family-of-characteristic-curves F memory, storing values for flash frequencies dependent upon the speed and/or the altitude and/or the acceleration of the airplane (the depicted family of curves represents the flash rate as a function of speed and altitude in an orthogonal system of coordinates, for example). The control apparatus ST is linked to an incoming-data device E which, is electrically-conductively linked, for example, to a board computer B (an on-board computer) of the airplane for receiving data therefrom corresponding to the speed and/or the altitude and/or the acceleration of the airplane, and for transmitting the data to the control apparatus ST. On the basis of these incoming data the control apparatus ST generates, for example during the take-off phase, variable light flash frequencies, the frequency being increased from a beginning, lower number to a maximum number, for example, corresponding with increasing speed and altitude of the airplane, as is shown in the memory block M of the drawing, so as to be adapted to the speed and the altitude of the airplane.

In one embodiment, the flash frequency to be varied can depend upon only one parameter, that is either upon the speed or the altitude or the acceleration. In other embodiments, it has proven to be beneficial to make the variable flash frequency depend, for example, upon a family of characteristic curves predetermined by the speed and the altitude of the airplane. Further beneficial results are achieved by a variation of the flash frequency dependent upon a family of characteristic curves predetermined by altitude and acceleration. Depending on demands, all combinations of the mentioned flight parameters are possible for determination of the flash frequency.

Since there is an increase of flash frequency during take-off of an airplane, dependent upon flight parameters, the flash frequency during the landing phase of the airplane is reduced from a maximum frequency to a minimal frequency thereby achieving an increased warning effectiveness also during the landing phase so as to take into consideration the typical behavior of birds. In order to attain an increased service life of the apparatus and at the same time ensure that light flash generation only takes place if the airplane is in an air space in which bird impact can occur, the generation of light flashes is switched off once the airplane reaches a predetermined altitude and/or a predetermined speed.

The process and the apparatus are therefore usable in all types of airplanes including helicopters and vertical take-off planes without needing adaptation. The light flash generation can also be switched on manually or automatically in each phase of the flight so that the process or the apparatus can be used, for example, also for the avoidance of airplane collisions since the manner of flash production results in increased warning effectiveness and thereby in an increased safety.

In the embodiment depicted in the only figure, the apparatus is limited to a control apparatus ST, an ignition device Z and a light source L. In other embodiments, several light sources L may be used which are controlled by one common control apparatus ST or by several control apparatus ST and several ignition devices Z. In addition, one or several power supply apparatus may be used when engaging several light sources L.

It is beneficial that the flash frequency is varied in dependence upon the speed and/or the altitude and/or the acceleration of the airplane, because in an uncomplicated and cost-effective way (since these signals can be easily accessed in an airplane) a variation of light flash frequency can be achieved which provides an optimum range of flash frequency for all take-off and landing phases thereby increasing the effectiveness of the process and, in addition, ensuring that birds, in areas where the airplane may encounter them, are positively and reliably chased out of the range of the airplane. In addition, it proves to be especially beneficial that by using flight parameters for the determination of flash frequencies the process can be installed, without adaptation, in each kind of airplane and, in addition, is independent from the degree of loading of an airplane since it is not dependent on fixed times, whereby costs for the apparatus, its mounting and its production are reduced, and safety during operation of the airplane is increased.

The same benefits are available when achieving the object with the limitations wherein a memory of the control apparatus is a family-of-characteristic-curves memory, storing data for the flash frequency dependent upon the speed and/or the altitude and/or the acceleration of the airplane, and comprising an incoming-data device connected to a board computer providing data of the speed and/or the altitude and/or the acceleration of the airplane.

It is also beneficial that the variation can be activated during landing and take-off phases, resulting in an effective prevention in all ranges where bird impacts may occur.

It is beneficial that data for the flash frequency, dependent upon the speed and/or the altitude and/or the acceleration of the airplane, are stored in memory thereby allowing especially easy access to these data during operation of the airplane and providing them with high accuracy.

Storing the data for the flash frequency in a family of characteristic curves results in the benefit that for all types of airplanes under all kinds of flight conditions and loading conditions, an optimal flash frequency is always switched on in a certainly-sufficient flight space in which bird impacts may occur.

It is further beneficial that reaching a predetermined altitude and a predetermined speed of the airplane causes a switching-off of light flash generation, because in this manner an automatic turn-off is assured which, on the one hand, makes certain that light flash generation is turned off in a flight space in which no bird impact can occur, and ensures, on the other hand, a particularly long service life for an apparatus for the generation of light flashes used according to this invention.

It is also beneficial that light flash production can be switched on manually or automatically in each phase of flight, thereby allowing, in an uncomplicated and cost-effective manner, selective use of the process for the avoidance of bird impacts on airplanes and for the avoidance of airplane collisions, whereby safety, during operation of an airplane, is substantially increased through an increase in warning effectiveness.

In this respect, it is particularly beneficial that light flash generation can be switched on automatically so that at recognition of danger of collision, for example by means of an automatic radar apparatus in an airplane, light flash generation increases safety of operation of the airplane by means of increasing warning effectiveness. An example in this regard is shown in the drawing and will be described further in the following with reference to the drawing.

The embodiments of the invention in which an exclusive property or privilege are claimed are defined as follows:

1. A process for the avoidance of bird impacts on airplanes by means of at least one light source on an airplane generating light flashes at a flash frequency which is automatically varied through at least one cycle in dependence upon at least one of the speed, the altitude and the acceleration of the airplane, wherein the data for the flash frequency are stored in memory as a family of characteristic curves which are functions of at least two of said speed, altitude and acceleration wherein a variation in the landing and take-off phases can be selectively actuated.

2. A process as in claim 1 wherein data for the flash frequency in dependence upon at least one of speed, altitude and acceleration of the airplane are stored in memory.

3. A process as in claim 1 wherein the light flash generation is automatically turned off in response to the airplane reaching a predetermined altitude and a predetermined speed.

4. A process as in claim 3 wherein the light flash generation can be switched on either manually or automatically in each phase of flight.

5. A process as in claim 1 wherein the flash frequency is a function of at least two of the speed, the altitude and the acceleration of the airplane.

* * * * *